Dec. 31, 1963          R. D. MARX          3,115,894

PLURAL COMPARTMENT TANK WITH VENT AND OUTLET VALVE CONTROL MEANS

Filed Feb. 12, 1960          4 Sheets-Sheet 1

INVENTOR
Robert D. Marx
BY
Morgan, Finnegan, Durham & Pine
ATTORNEYS

INVENTOR
Robert D. Marx
BY
Morgan, Finnegan, Durham & Pine
ATTORNEYS

United States Patent Office 3,115,894
Patented Dec. 31, 1963

3,115,894
PLURAL COMPARTMENT TANK WITH VENT
AND OUTLET VALVE CONTROL MEANS
Robert D. Marx, Valley Stream, N.Y.
(952 Meeker Ave., Brooklyn 22, N.Y.)
Filed Feb. 12, 1960, Ser. No. 8,420
21 Claims. (Cl. 137—576)

This invention relates to fluid storage and control systems, more particularly to portable storage systems such as truck tanks and to the loading and dispensing systems therefor.

Present systems for loading, carrying, and dispensing fluids, e.g., fuels, are generally adequate for their basic functions but have certain performance limitations which have taken on added significance as transportation time becomes of the essence. While the actual portal-to-portal transportation time is generally not dependent on the characteristics of the tank nor on the fluid control system, the unloading time is dependent on these factors and this unloading time has taken on considerable importance for certain users. In the case of the aircraft industry, for example, it is desirable that aircraft "down-time" be kept to an absolute minimum. A burden is accordingly placed on the refueling operation. The refueler must discharge its contents as rapidly as possible.

Similar rapid unloading rates are required in the case of cryogenic fluids such as are used for fueling missiles. Present refuelers are not adapted to properly carry this burden since their dispensing rates are unsatisfactorily low. Inherent design factors are the chief cause of this inadequacy. For example, in a typical refueler a manifold header is provided with valved connections thereto from each compartment of the refueler tank. With the compartments emptying into this manifold, conditions of drag and turbulence are generated which drastically limit the dispensing rate. Another factor contributing to this condition is improper venting which may also cause structural damage to the tank. Other, indirect, contributing factors result from design limitations established by regulatory bodies such as the ICC and by the rules and regulations of local bodies, e.g., port and aviation authorities. Safety factors also limit tank and control system design and thus contribute to performance deficiencies. Thus, design features adapted to minimize the effects of collision and fire frequently conflict with the criteria for high dispensing rates.

The invention seeks to overcome the aforementioned shortcomings and limitations, one object being the provision of a tank which has markedly improved dispensing rates.

Another object of the invention is to provide a tank which while having unequalled loading rates nevertheless incorporates safety features substantially improved over prior art structures and prior art systems and which meets the requirements of underwriters and Federal and local authorities.

Another object of the invention is the provision of a tank system with improved actuating means which lessen manual operations and decrease the possibility of human error.

A still further object of the invention is a tank system having improved structural integrity and greater capacity per unit of structural weight.

A still further object of the invention is to provide improved cooperation means between venting and liquid valves.

Another object of the invention is to provide improved vent valves and vent valve operation.

These and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally the invention provides a multiple compartment tank having novel geometry and control arrangements and one in which the usual header arrangement is eliminated; a novel cooperation of valves is also provided. Improved coupling mechanisms for controlling the relation between liquid valves and associated vent valves are also provided. A novel vent valve and a novel pneumatic control system for the loading, venting and dispensing of fluids are additional provisions of the invention.

The invention thus consists of the novel parts, constructions, arrangements, combinations and improvements herein shown and described.

Exemplary embodiments of the invention will be described hereinafter and are illustrated in the drawings herein.

Figure 1:
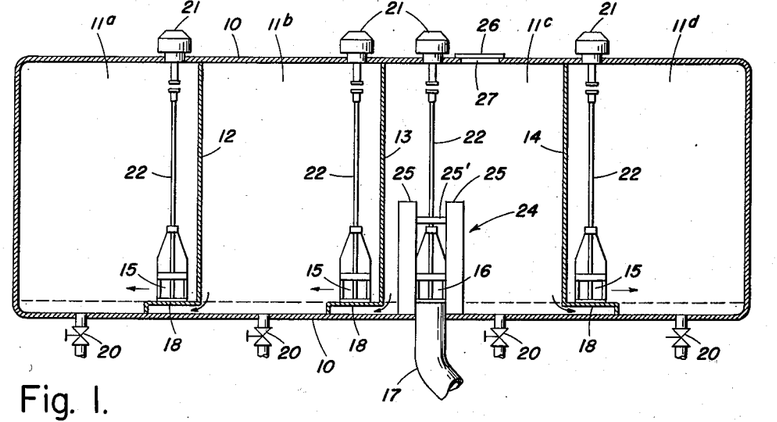
FIGURE 1 is an elevation view partly in section of a tank embodying features of the invention.

The components of a tank, embodying features of the invention are illustrated in FIGURE 1 and includes an external casing or shell 10 which defines a generally rectangular interior divided into a plurality of compartments 11a, 11b, 11c and 11d by partitions 12, 13 and 14. While the overall shape of the tank is designed in this exemplary embodiment to be consistent with standard refueler truck tank configurations, it is not limited insofar as the invention is concerned to any specific shape. It should also be understood that while four compartments 11a, 11b, 11c and 11d have been shown, the invention contemplates different numbers of compartments, a specific quantity being determined by the intended capacity of the tank, the strength of its walls and other technical (and legal) requirements.

Each of the compartments 11a, 11b, 11c and 11d is isolated from the other compartments except when one or more of the coupling valves 15 are opened. These liquid valves interconnect the compartments, a valve 15 connecting compartments 11a and 11b, another valve 15 connecting compartments 11b and 11c and a third valve 15 connecting compartments 11c and 11d. A fourth valve 16 connects compartment 11c to the outlet line 17 which connects in turn to the usual pump, filters, valves, meters, etc., and discharge nozzle, not shown.

The partitions 12, 13 and 14 which divide the tank into its compartments 11a, 11b, 11c and 11d each include a step-shaped member integral with the respective partition or secured thereto as by welding. In the region behind each step the respective partition is cut away so as to provide a passage between the adjacent compartments via the valve 15 mounted on the step. This arrangement, in addition to providing a base for each valve also defines a water retention area below the valves, the dashed line of FIGURE 1 indicating the upper boundary thereof. Discharge valve 16 is also elevated from the base of the tank so as to keep it clear of this area. Drain valves 20 are installed in the base of shell 10 to permit draining of water from the water retention area.

Each of the internal valves 15 and discharge valve 16 is a component of a flow control system associated with each compartment. Each system includes a vent valve 21 and an actuator mechanically coupled via lift rod 22 to the associated valve 15 or 16. The manner whereby these valves are actuated will be described hereinafter.

Associated with the discharge valve 16 is an anti-vortex device 24, comprising, in a cylindrical orientation, three upstanding blades 25 which surround valve 16 and serve to prevent the formation of a vortex as the tank contents are discharged therethrough. The blades are secured to the shell 10 as by welding and are connected together by braces 25. A space between the blades sufficiently wide to enable removal of the valve is provided.

In operation, the tank is loaded through main filling port 26 after the fill cover 27 is removed. During the loading operation valves 15 and their associated vent valves 21 are opened permitting the load to fill all the compartments. In some installations valve 16 remains closed; in others valve 16 is also opened and a valve in outlet line 17, not shown, is maintained closed to prevent the discharge of fluid via valve 16. Some installations also provide selective operation of the compartment valves such that the compartments can be selectively unloaded. As the tank is loaded, the fluid passes from compartment 11c into the other compartments as indicated by the arrows. Since valves 21 are open during this time, proper venting is provided.

In discharging the tank, as for example, when refueling an aircraft, valves 15 and 16 and associated vents 21 are opened and the tank contents thereby discharge, passing from compartment 11d and compartments 11a and 11b, through valves 15 into compartment 11c in a direction opposite to that indicated by the arrows. The flow is thence via valve 16 into outlet line 17 and finally through additional valves, a pump, filters and metering, not shown, into the aircraft tanks.

The discharge rates attainable with tanks constructed according to the invention are substantially higher than those of presently used tanks, being as high as 720 g.p.m. Moreover, substantial increases in capacity for a given permissible truck load can be realized by increasing the number of compartments above the conventional quantity. This permits a reduction in the required thickness of the shell thereby providing a substantial weight reduction which enables a larger payload. High unloading rates are nevertheless obtainable even though the number of compartments is increased.

The superior performance of the instant embodiment is also reflected in greater fuel storage capacity obtained by the elimination of the space required by the header. Elimination of headers also reduces the dangers of fuel loss and fire in event of collisions. The compartments have greater structural integrity by virtue of the elimination of the external connection therefrom to the header.

Figures 2, 2A, 4B:
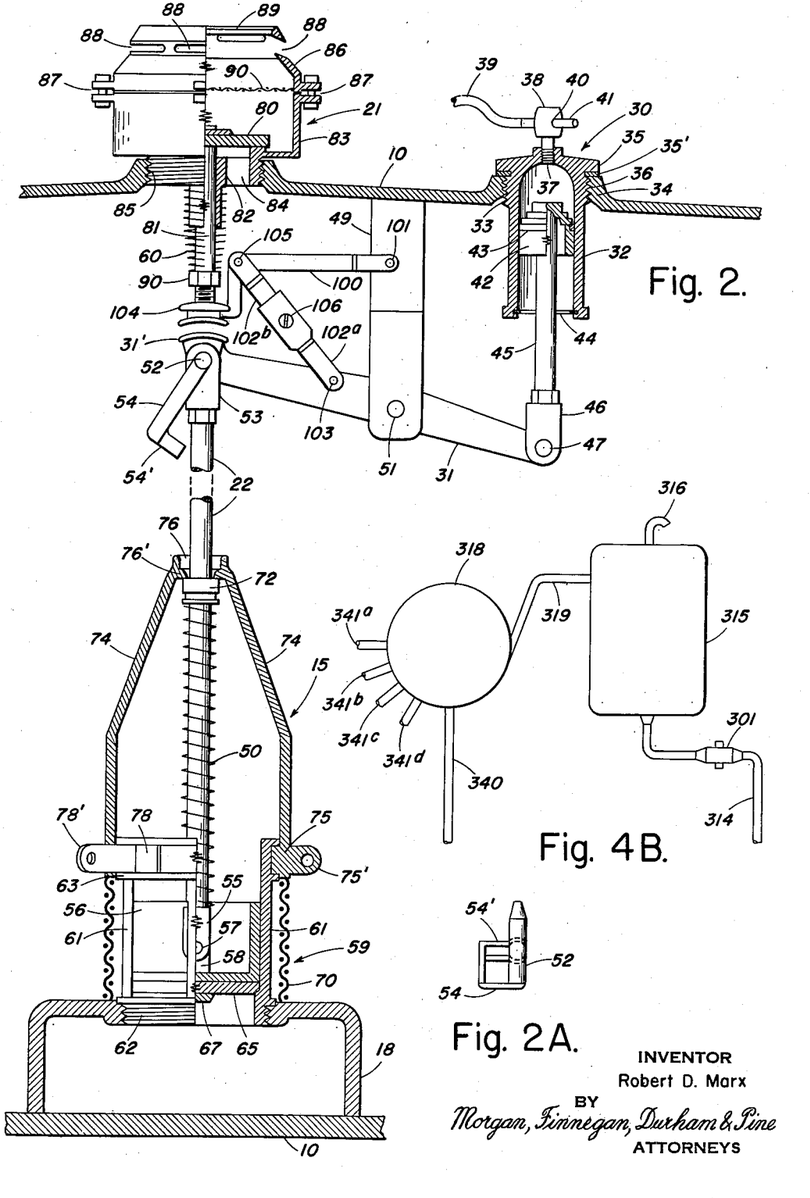
FIGURE 2 is an elevation view, partly in section, of an improved valve arrangement.
FIGURE 2A is a detail drawing of a component of the structure of FIGURE 2.
FIGURE 4B illustrates schematically an alternate installation employing features of the arrangement of FIGURE 4.

Considering now the details of one control system adapted for use in the tank of FIGURE 1 or in other tank embodiments, reference may be had to the embodiment illustrated in FIGURE 2. This system, adaptable to any of the compartments, includes the vent valve 21, the internal valve 15 (or 16), the lift rod 22 and means for operating the lift rod comprising a pneumatic or hydraulic actuator 30 which positions rod 22 via lever 31.

The actuator 30 may comprise a device such as is disclosed in applicant's U.S. Patent No. 2,652,070 issued September 15, 1953. The actuator disclosed herein, which is substantially similar to the one in said patent, comprises a cylinder 32 with an external thread 33 which engages a tapped section 34 of shell 10. A flange 35 on the top of cylinder 32 is seated on a gasket 35' inserted between the flange and a shoulder 36 of tapped section 34.

Mounted in tapped hole 37 in the top of cylinder 32 is fitting 38 to which hydraulic line 39 is connected. This fitting also includes a bore 40 normally closed by a fusible plug 41 of low-melting-point alloy such as solder or Wood's metal. This arrangement, by diverting hydraulic pressure from the actuator, insures automatic closure of the valves in case of fire. A spring 50, associated with the internal valve 15, and a spring 60 in the vent valve assembly 21, insure closure of these two members when control pressure in actuator 30 is relieved.

During normal conditions, application of control pressure to actuator 30 causes a depression of a piston 42 slidably mounted in cylinder 32. An O-ring 43 promotes proper sealing between the piston and cylinder and a lock ring 44 limits down travel of the piston.

Attached to piston 42 is piston rod 45. Threaded on the other end of the rod is yoke 46 the arms of which straddle one end of rocker arm 31 and are pivotably coupled thereto by clevis pin 47. Rocker arm 31 is pivoted by means of pin 51 on bracket 49, the latter being secured to shell 10. The other end of arm 31 is pivotably connected by a pin 52 to yoke 53 threaded on lift rod 22.

In applicant's aforementioned patent, the connection of the rocker arm to the lift rod was accomplished by means including a key-shaped pin which engaged a slot in the lift rod and a keyhole in the rocker arm, the rocker arm thereby being pivotably connected to the lift rod. The pin was equipped with a handle and in disassembling the arm and rod, the handle was rotated to that angle at which the keyed pin was aligned with the keyway in the arm. At this angle the pin could be removed from the arm and from the lift rod; at all other angles the pin was effectively locked in position.

While this arrangement has proved effective, it has the disadvantage of requiring the positioning of the handle to a precise angle in order to effect removal of the pin. To eliminate this requirement applicant has devised the arrangement illustrated in FIGURES 2 and 2A wherein pin 52, which is not keyed, is equipped with a transverse handle 54 having a U-shaped clamp 54' extending therefrom. The resilient fingers of clamp 54' straddle lift rod 22 when handle 54 is depressed to its lowermost position thereby retaining pin 52 in position. For disassembly it is only necessary to pull handle 54 away from the rod 22 thereby disengaging clamp 54' and enabling removal of pin 52. This removal can be effected at any convenient angle of handle 54.

Connected to the lower end of lift 22 is a yoke 55 which is connected to piston 56 of the internal valve by a pin 57 which couples the yoke to the piston bolt 58. Piston 56 is slidably mounted in the cylindrical cage 59 which includes vertical piston guides 61 arranged in cylindrical fashion around the peripheries of a threaded base 62 and a collar 63. Base 62 is generally ring-shaped, the open central section having a bevelled edge which receives the seat 65 of piston 56. The seat is secured to the piston by bolt 67 and serves to seal-off the valve by closing the open region of base 62.

Forming the external surface of cage 59 is a screen 70 which acts as a filter, the tank's contents passing therethrough in flowing into and out of the tank. As is evident in FIGURES 1 and 2, cage 59 is secured to step 18 in the base of each compartment by screw engagement or other suitable means such as a flange arrangement.

To open valve 15 (or 16), pressure is applied to actuator 30 causing piston 42 and rod 45 to move down. Rocker arm 31 thus rotates clockwise causing lift 22 and consequently piston 56 of valve 15, to move up. When the piston moves out of contact with the base 62 of valve cage 59 liquid is free to flow through screen 70 in a direction which depends on whether the tank is being loaded or discharged.

When pressure is removed from actuator 30 valve 15 is closed by virtue of the action of spring 50 which seats the piston 56 of the valve, one end of the spring applying a downward force to the yoke 55 connected to the piston. The spring 50, which is disposed on and coaxial with lift 22, has its other end abutting a collar 72 loose and coaxial on lift 22. The collar position is restrained by a semi-circular ring 76 having a lip 76' which seats on the collar. Ring 76 is integral with two vertical bonnets 74, the lower ends of which are integral with a semi-circular bonnet strap 75 disposed in a grooved recess in cage 59. For clamping the strap in this recess, a pair of arcuate clamps 78 are provided, each including an ear 78' which aligns with a corresponding ear 75' on strap 75. Each pair of ears is bolted together through the holes provided in the ears. The foregoing arrangement provides an improvement over means illustrated in applicant's aforementioned patent. Disassembly procedures have been considerably simplified with valve 15 being readily removable from the exterior of the tank shell without the need for entering the tank.

In other respects the above-described combinations of actuator 30, rocker arm 31, lift rod 22 and internal valves 15 (or 16), are similar to the system described in applicant's aforesaid patent. The vent valve 21 is also similar to a vent valve, illustrated and described in applicant's U.S. Patent 2,821,991 issued February 4, 1958. As presently embodied the vent or relief valve comprises a valve head 80 and stem 81 attached thereto, the stem being slidably disposed in a central guide boss 82 concentric with the base of lower valve casing 83 and integral therewith by virtue of radial struts 84. Lower casing 83 includes threads 85 by means of which the casing is secured to shell 10. Secured to lower casing 83 is an upper casing 86, these components being joined by bolts and nuts 87 which join flanges of both casing sections.

For normal venting, upper casing 86 is equipped with ports 88. In event of excess heat as when there is a fire, the upper casing is also supplied with a fusible blow-off disc 89 which separates from the casing thus permitting a vertical jet-like discharge of the tank's contents in a stream away from the tank shell 10. Such a high-velocity discharge is also promoted by the constricted configuration of the valve. In the event of ignition of the tank vapors, complete combustion thereof is insured by the presence of augmenting air drawn into the escaping stream through ports 88 under the influence of Bernoulli pressures associated with the issuing stream. For preventing back-burning, a screen 90 is included in the vent valve, being clamped between the upper and lower casings 83 and 86.

In operation, valve head 80 is urged into the closed (down) position by means of spring 60 one end of which engages valve stem 81 via a nut 90 the other end of which is seated against the rim of boss 82. Either an excess pressure within the tank or a physical displacement of the valve caused by rocker arm 31 causes the valve to open against the action of spring 60. The former provides pressure relief when the internal tank pressure increases beyond a safe point. The latter provides the vacuum relief which is required when the tank valves are opened during unloading. Vacuum relief while the valves are closed is not provided in this arrangement. Its use in the tank of FIGURE 1 accordingly requires that the latter be equipped with separate vacuum relief vents.

While the valve as illustrated in the patent is without association with the above-described actuator and internal valve, such a use as generally illustrated in FIGURE 2 is known. This arrangement permits positive venting, i.e., the automatic opening of the vent when the internal valve is opened. Even with this known arrangement, however, a shortcoming exists in that the internal valve 15 or 16 opens to a substantial degree before the vent valve opens. This is due in part to the relative dimensions of the internal valve and the vent, these dimensions being fixed by other considerations. Thus, the designed travel of piston 56 of valve 15 from the full-closed to the full-opened positions may be 2½ inches in a typical installation while the maximum travel of the vent is ⅝ inch. (The lift rod in the known arrangement accommodates both movements by virtue of the clearance between the left seat of rocker 31 and the stem of the vent valve when both valves are closed.) If the tank operator should fail to open fully the internal valve 15 or 16, specifically, if in this example, he opened it a distance of 1⅞ inches or less, then although this valve were open, the vent would be closed. Such an inadvertent action can at worst collapse the tank and at best it impedes the unloading operation. To prevent these results, applicant has provided an improvement which does not require any significant re-working of the known system and which is simply installed. It also is adjustable to permit adjustment of the relationships among the actuator, internal valve and vent.

To effect these objects a linkage is installed in combination with rocker arm 31 and its associated bracket 49 and includes a link 100 having at one end a yoke pivotably secured to bracket 49 by pin 101, and at the other end, a displaced foot 104 which seats on the pad 31' of rocker 31. Also provided is a second link formed of two segments 102a, 102b, the former being pivotably secured at its lower end to an intermediate point on rocker 31 by pin 103. Pin 103 is located slightly above the center line of the rocker. The yoke end of link 102b is pivotably secured by pin 105 to the bend in link 100.

If the path of foot 104 is traced as rocker 31 rotates, it may be observed that vent valve 21 opens simultaneously with internal valve 15 (or 16) since the stem 81 of the vent valve is carried on foot 104 which moves when rocker 31 moves. The total movement of foot 104 is less than the movement of lift rod 22 (and therefore less than the movement of valve 15 connected thereto) because the foot is actuated from an intermediate eccentric point, rather than the end point, of rocker 31. Since the travel of foot 104 is less than that of valve 15 it accommodates the travel of vent valve head 80 which is, by design, less than that of valve 15. Accordingly, both valves are simultaneously actuated, they travel unequal distances and they reach their full-open positions substantially simultaneously. This arrangement alleviates the above-described shortcomings inherent in the prior arrangement. Moreover, precise coordination of the vent and internal valve is insured by the variable feature of the arrangement which enables adjustment of the overall length of the link formed by segments 102a and 102b. This is effected by disposing link 102b in a recess in the enlarged section of link 102a and providing a set screw 106 for locking the two links together after adjustment has been made. Also inhering in the above-described improvement is a safety feature involving the possibility of breakage of the mechanism involving linkage 100, 102a, 102b. In such event it is still possible to operate the vent valve as rocker 31 will ultimately contact the stem of the vent valve and open it.

While the above fluid control systems have proved extremely effective, the applicant in a search for even better results, has devised another vent valve which in certain respects provides performance improved over that provided by the arrangement of FIGURE 2. This embodiment is illustrated in FIGURE 3 and FIGURE 3A.

Figure 3:
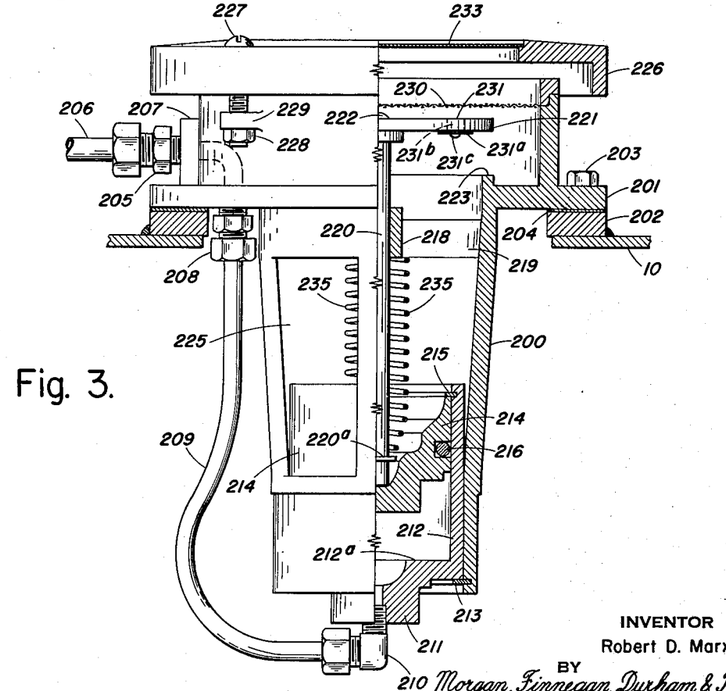
FIGURE 3 is an elevation view partly in section of a fluid-operated vent valve which can be used in tank systems including the embodiments of FIGURES 1 and 2.
Figure 3A:
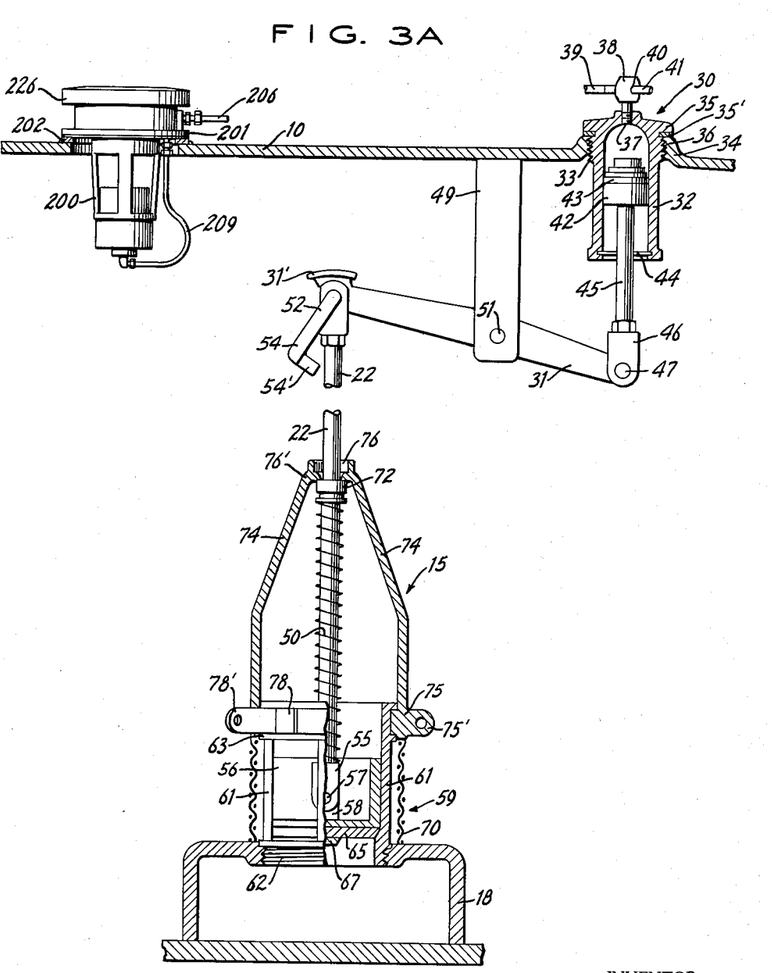
FIGURE 3A is an elevation view partly in section of a control system including the valve of FIGURE 3.

The valve of FIGURE 3 is fluid operated, preferably by hydraulic pressure. A system adapted to operate this valve is described hereinafter. As embodied, the valve includes casing 200 having a flange 201 which is secured by bolts 203 to a saddle 202. The latter is secured to shell 10, as by welding. A sealing of the valve and saddle is afforded by gasket 204.

Installed in the upper section of casing 200 is fitting 205 to which is connected line 206. This line supplies control pressure to the valve via the path which includes fitting 205, a passageway in the casing 200, the lower end of the passageway including a fitting 208 threadably installed therein. The path thereafter includes line 209 connected to fitting 208 and a third fitting 210 connected at one end to line 209 and threaded at the other end into a passageway in boss 211 integral with a cylinder 212. The latter is installed in the base of casing 200 and is secured thereto by lock ring 213. Cylinder 212 is concentric with casing 200 while a piston 214 is concentric with the cylinder, being slidably disposed in the interior thereof. A retaining ring 215 disposed in the wall of cylinder 212 limits the upward travel of the piston and relieves strains on a valve stem 220 seated on the piston. An O ring 216 seals the piston with respect to the walls of the cylinder.

In the central region of casing 200 and concentric therewith is a boss 218 integral with the casing by virtue of struts 219. Slidably disposed in a bore in the boss 218 is the valve stem 220, one end of which is seated in the central bore of piston 214, the other end of which is secured to a valve head 221 by means of a screw 222. A spring 235, coaxial with stem 220 has one end thereof abutting the shoulder of boss 218 while its other end contacts retaining ring 220a on stem 220 such that the latter, and piston 214, are urged into their lowest positions where the piston seats on rim 212a of cylinder 212 and valve head 221 seats on rim 223 of casing 200 thus sealing the interior of the tank except for normal "breathing" actions. These latter conditions involve pressure relief and vacuum relief. Vacuum relief involves the intake of air through three slotted vacuum relief vents 231 each of which includes a resilient blade 231a pinned at one end as by rivets 231c to the head 221 and oriented to seal the slotted aperture 231b in the valve head 221, except when vacuum conditions in the tank, e.g., 3 p.s.i. differential, overcome the resilient force in the blades to cause the vent to open. For pressure relief, valve head 221 leaves seat 223 under the direct influence of tank internal pressure, the stem 220 also leaving piston 214. Whether the valve head is to be controllably elevated by the application of hydraulic pressure to the base of cylinder 212, which causes the piston, valve stem and valve head to rise, or, is to be actuated directly by internal tank pressure to provide pressure relief as described above, communication between the interior of the tank and the atmosphere is afforded via ports 225 in casing 200, through the annular passageway defined by the casing and the valve and thence through the upper annular exit formed by the spacing between the casing and a cap 226 secured thereto by bolts 227 and nuts 228. These join the cap to lugs 229 on the casing. Included in this passageway is a screen 230 which functions both as a filter and to prevent back burning in event of a fire. Other features operative during a fire include blow-off disc 233 which is secured by readily fusible material such as solder or Wood's metal to cap 226. The valve is designed to be connected to a fused point of the hydraulic system. If this is not practical a separate fuse may be provided.

The valve illustrated in FIGURE 3 has many significant features. Since it is a fluid-operated and has a wide diameter cylinder it may be made to open (e.g. at 11 p.s.i.) before the associated compartment fuel valve opens (e.g. at 40+p.s.i.) and to close after the latter closes thus affording optimum venting and providing high discharge rates. The possibilities of tank collapse are also eliminated. This valve in combination with a six inch internal valve, enables pumping rates in refueler trucks in excess of 700 g.p.m.

The valve of FIGURE 3 also provides maximum safety features to minimize the effects of truck collisions, turnover and fires and the pressure-vacuum relief arrangement eliminates the need for separate vacuum relief vents such as are employed in fill covers. Unlike prior art arrangements which require entry into the tank compartment for servicing (e.g. adjusting, installing and removing) the valve of FIGURE 3 may be serviced from outside the tank. Moreover, it may be used in a standard tank configuration or in the arrangement of FIGURES 1 and 2 and can be actuated by the conventional hydraulic system or by the novel pneumatic-hydraulic arrangement described hereinbelow. When utilized in a tank, the valve of FIGURE 3 need not be mounted in juxtaposition with the hydraulic operator and internal valve lift rod as illustrated in FIGURE 2 but rather can be installed at a remote point (see FIG. 3A). This is particularly advantageous where the tank is mounted in an inclined position such that the liquid level leaves a clearance with respect to the top of the shell only in a region which is remote from the internal valve. The vent valve may be located in this free space region.

In connection with its use in the arrangements of FIGURES 1 and 2, it is intended that the valve of FIGURE 3 be substituted for valve 21 in those figures, line 206 being connected to line 39 of FIGURE 2 (see FIG. 3A).

The time expended in unloading a tank of liquid is dependent not only on the tank configuration per se but also on the various control devices which initiate and control the unloading. The nature of the various control devices such as manual operation valves, manual hydraulic pumps and the like, influence significantly the time of unloading since such devices determine the effort required of and the time expended by the operator to set up, carry out and secure the unloading operation. Presently-used systems require rather elaborate and time-consuming procedures, one of the primary expenditures of time being associated with the manual pump presently used in hydraulic valve control systems.

In a typical truck-tank installation the following steps are performed:

(1) Compartment selector operated.
(2) Hydraulic operator manually pumped until pressure builds up to operating level; this opens the selected compartment valves.
(3) Clutch disengaged; power take-off engaged; clutch engaged; discharge pump actuated.
(4) Meter valve opened; discharge nozzle inserted in tank.
(5) Nozzle valve opened; unloading begins.

This procedure is not only time consuming but is also productive of a frequent misstep which consumes additional time: if the driver inadvertently engages the power take-off before he pumps the hydraulic operator then the vacuum created by the discharge pump prevents the compartment valves from opening. To correct this, the operator must disengage the power take-off, relieve hydraulic pressure and relieve the vacuum. The correct procedure must then be performed. It is evident that substantial time is involved in the whole operation.

The known systems have other disabilities: if the hydraulic operator is not fully pumped then the selected compartment valves do not fully open and the unloading rate suffers. Even if full operating pressure is developed by sufficient manual pumping, the valves in many installations nevertheless close at least partially due to leaks in the system. The unloading rate again suffers and when it becomes noticeably poor, the operator must again pump the hydraulic operator.

Other limitations on the effectiveness of presently-employed arrangements relate to the possibility of driving the truck away after unloading without closing the compartment valves and also relate to the need for maintenance of the hydraulic operator which is quite complicated. This operator also has a predisposition to fail under adverse, but frequently encountered conditions such as icing.

The invention contemplates a control system arrangement in which the above shortcomings are eliminated. Specifically, the embodiments of the invention hereinafter described require operating procedures substantially simpler and of shorter time duration than known arrangements. These embodiments are also unaffected by leaks in the system; the valves operated in the embodiments open automatically and fully without the need for manual pumping and remain fully open notwithstanding leaks. The system of the invention is also arranged so that it may be employed with presently-used truck tanks. Further, the possibility of missteps in the operating procedure are substantially minimized in the arrangement. The above features are realized in part by exploiting a pneumatic system generally available in tank-carrying trucks and in part by fluid control devices and arrangements thereof.

Figures 4, 4A:
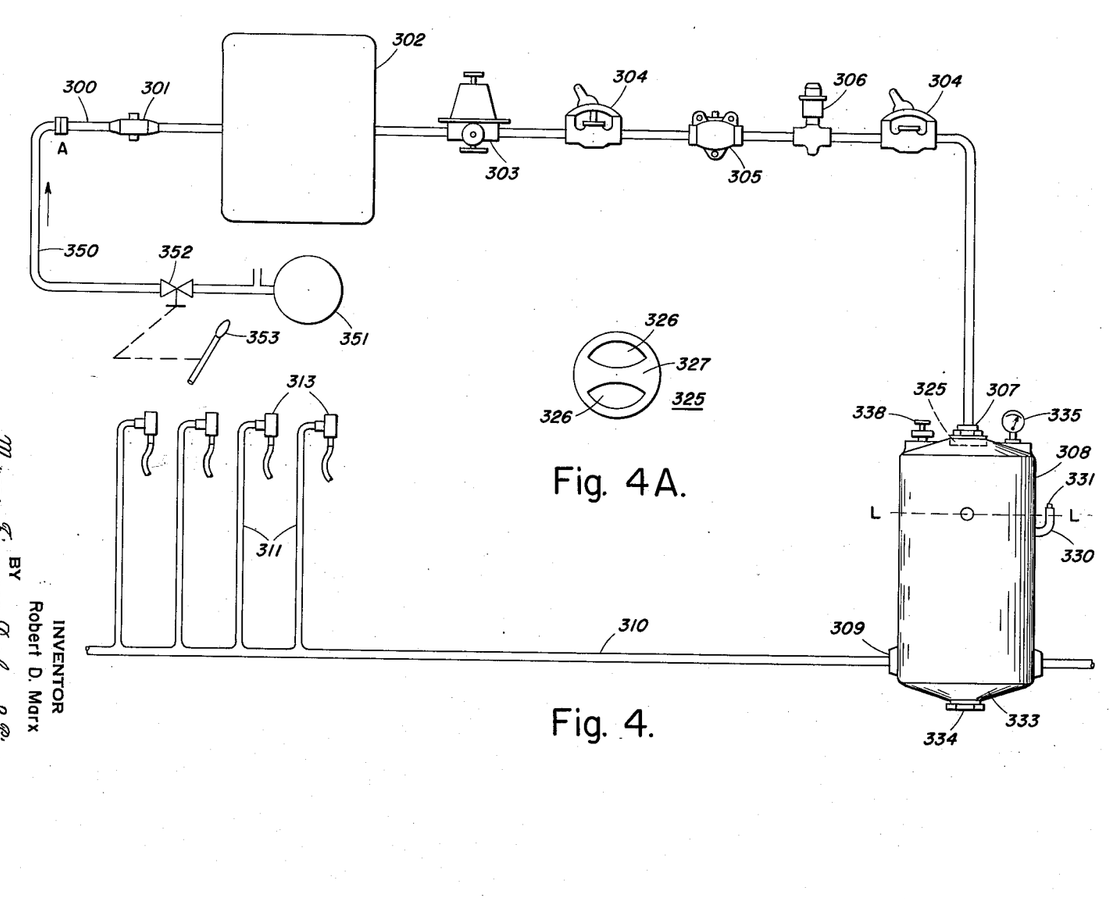
FIGURE 4 is a system schematic diagram illustrating a pneumatic control system for controlling tank loading, storage and dispensing.
FIG. 4A is a detail thereof.

In FIGURE 4 an exemplary embodiment is disclosed which is representative of a typical truck-tank configuration. It comprises a control system fed by pneumatic pressure derived from the pneumatic brake system of the vehicle.

This pressure is applied to line 300 which preferably though not essentially includes check valve 301 and reservoir 302 serially connected thereto. From the output of reservoir 302, air pressure is fed to regulator 303 thence to three-way valve 304 which constitutes an emergency control valve. This valve is termed "three-way" since in the "off" position it not only cuts off pressure at the outlet thereof, but also supplies venting of the outlet side of the valve to the atmosphere.

From valve 304 the pneumatic line is connected to cabinet door interlock valve 305 which is closed when the door of the control cabinet is closed. From valve 305 connection is made to a fusible pressure release 306 which contains a fusible plug adapted, in the presence of excessive heat, to open the pneumatic line to the atmosphere for the release of pneumatic pressure. Connection from the outlet of the release 306 is made to another three-way valve 304, this being the manual operation valve.

The output end of manual valve 304 is connected to the input 307 of an accumulator 308, to be described hereinafter. Application of pneumatic pressure to accumulator 308 develops pressure in the hydraulic liquid therein and this hydraulic pressure is transmitted from output port 309 to line 310 which feeds the hydraulic lines 311 in the individual tank compartments. The terminal end of each line 311 connects to a hydraulic actuator 313 which serves to operate the compartment fluid and vent valves.

It is to be understood that the foregoing arrangement of control elements 301, 302, 303 . . . 306 may vary from installation to installation depending upon particular characteristics of each system.

In converting the pneumatic pressure transmitted to input 307 of accumulator 308 to hydraulic pressure transmitted to line 310, it has been found that certain adverse effects occur including a tendency for the hydraulic fluid to atomize in the presence of pneumatic pressure supplied at input 307. To obviate these difficulties a diffuser 325, FIGURE 4A, is employed at the input section 307 of accumulator 308. This diffuser is generally disc-shaped, the periphery being threaded for insertion in the accumulator. Included in the diffuser are a pair of ports 326 diametrically separated so as to leave a bridge 327 therebetween. This diffuser serves to prevent adverse reactions between the pneumatic pressure and the hydraulic fluid.

Also included in the accumulator 308 is a fill tube 330 equipped with a plug 331 which is removed for the purpose of filling the accumulator with hydraulic fluid. The normal liquid level is shown by lines L—L in FIGURE 4. The accumulator 308 also includes sump 333, a drain plug 334 therefor, and a pressure gauge 335. A pressure relief valve 338 is also included in accumulator 308 on a land conventionally located on the top of the accumulator.

The system of FIGURE 4 is adapted to be connected at a point A in the pneumatic system of the truck. This point corresponds to that section 350 of the truck's pneumatic system which is pressurized by compressor 351 through valve 352 when the brakes 353 are set. By this arrangement the possibility of moving the truck without securing the unloading operation is prevented. Moreover, the fluid and vent valves will remain fully actuated notwithstanding leaks in the system since point A in FIGURE 4 is continuously pressurized by virtue of the compressor operation in the truck's pneumatic system. Thus, when the arrangement of FIGURE 4 is used in cooperation with the embodiments of FIGURES 1, 2 and 3, the valves shown therein remain fully open during the unloading operation even though the control system may be suffering from leakage.

The arrangement of FIGURE 4 is illustrated in connection with tank configurations of the type wherein all the compartment valves are simultaneously actuated from hydraulic distributing points 313. The system is equally adapted, however, to operate systems such as those shown in FIGURE 4B in which the known compartment selector 318 is employed. In this arrangement output port 309 of FIGURE 4 is connected to return line 314. A connection is made to check valve 301 and thence to return line receptacle 315 which is serially connected to the check valve 301. Receptacle 315 includes a vent 316 and is also connected to line 319, the other end of which connects to compartment selector 318. The above-described arrangement comprises the return system of FIGURE 4B. For supplying hydraulic pressure to the arrangement of FIGURE 4B a line 340 is provided which is connected to line 310 of FIGURE 4 at a point downstream from the point of connection of line 314. Line 340 thus couples hydraulic pressure to compartment selector 318 which is of known configuration. Means are included in the selector for selectively applying hydraulic pressure to lines 341a, 341b, 341c and 341d, which are routed to the respective compartment control valves. By this arrangement the compartment valves and their associated vent valves may be selectively operated as distinguished from unison operation of these valves illustrated in FIGURE 4. It is accordingly evident that the pneumatic-hydraulic arrangement of FIGURE 4 is adapted to function with several different control valve arrangements.

The invention in its broader aspects is not limited to the specific mechanisms shown and described but departures may be made therefrom within the scope of the accompanying claims without departing from the principles of the invention and without sacrificing its chief advantages.

What is claimed is:

1. Fluid storage and distributing means for truck tanks and the like comprising a tank having a plurality of compartments, passageway means within said tank between said compartments, said passageway means including compartment valve means for controlling the passage of fluid therethrough, discharge valve means within said tank in one of said compartments, said discharge valve means being coupled to an aperture in said one compartment for controlling the discharge of fluid therethrough, vent means on said tank communicating with said compartments and control means for independently and coordinately adjusting said vent means and said discharge means.

2. A system according to claim 1, in which partition means in cooperation with said tank define said compartments, said partition means including said passageway means and said compartment valve means being mounted on said partition means in the base region thereof.

3. A system according to claim 1, in which partition means in cooperation with said tank define said compartments, said partition means including step-shaped members in which said passageway means are provided and on the respective horizontal sections of which said compartment valve means are mounted.

4. A system according to claim 1, in which said vent means comprise a piston disposed in a fluid-energized cylinder.

5. A system according to claim 1, in which said tank cooperates with a plurality of partitions to define said compartments, said passageway means comprising respective aperture means in substantially horizontal sections of said partitions.

6. A system according to claim 5, in which said horizontal sections define the upper boundary of a contaminant area in the base of said tank.

7. Fluid storage and distributing means comprising a tank having a plurality of compartments, passageways means within said tank between said compartments, said passageways means including compartment valve means for controlling the passage of fluid therethrough, discharge valve means within said tank in one of said compartments, said discharge valve means being coupled to an aperture in said one compartment for controlling the discharge of fluid therethrough, vent means on said tank and control means for independently adjusting said vent means and said discharge means comprising energizing means, first coupling means between said energizing means and said vent means for making said vent means responsive to said energizing means and second coupling means between said energizing means and said discharge valve means for making said discharge means responsive to said energizing means, said vent means and said discharge means being substantially simultaneously activated by said energizing means upon actuation of said control means.

8. Fluid storage and distributing means comprising a tank having a plurality of compartments, passageway means within said tank between said compartments, said passageway means including compartment valve means for controlling the passage of fluid therethrough, discharge valve means within said tank in one of said compartments, said discharge valve means being coupled to an aperture in said one compartment for controlling the discharge of fluid therethrough, vent means on said tank and control means for concurrently adjusting said vent means and said discharge means comprising energizing means, fluid coupling means between said energizing means and said vent means for making said vent means responsive to said energizing means and coupling means between said energizing means and said discharge valve means for making said discharge means responsive to said energizing means, said vent means having characteristics adapted to cause said vent means to be actuated prior to said discharge means in response to said energizing means.

9. Fluid storage and distributing means comprising a tank having a plurality of compartments, passageway means within said tank between said compartments, said passageway means including valve means for controlling the passage of fluid therethrough, vent means in said compartments and a plurality of control means associated respectively with said compartments for independently and coordinately adjusting said vent means and said valve means in said compartments.

10. A system according to claim 9, in which said compartments are defined by partition means in which said passageway means are disposed.

11. A system according to claim 9, in which each of said control means comprise energizing means, first coupling means between said energizing means and said vent means for making said vent means responsive to said energizing means independently of said valve means and second coupling means between said energizing means and said valve means for making said valve means responsive to said energizing means.

12. A system according to claim 9, in which said partition means in cooperation with said tank define said compartments, said partition means including said passageway means and said valve means being mounted on said partition means in the base region thereof.

13. A system according to claim 9, in which partition means in cooperation with said tank define said compartments, said partition means including step-shaped members in which said passageway means are provided and on the respective horizontal sections of which said valve means are mounted.

14. A system according to claim 11, in which said first coupling means comprise fluid pressure transmission means and said vent means include characteristics adapted to cause said vent means to be actuated prior to said valve means.

15. A system according to claim 11, in which said vent means and said valve means are actuated substantially simultaneously.

16. Fluid storage and distributing means comprising a tank having a plurality of partitions defining a plurality of compartments, passageway means in said partitions, said passageway means including compartment valve means for controlling the passage of fluid therethrough, discharge valve means within said tank in one of said compartments, said discharge valve means being coupled to an aperture in said one compartment for controlling the discharge of fluid therethrough, vent means on said tank and control means for independently and coordinately adjusting certain of said vent means and the associated compartment valve means and other of said vent means and said discharge means, each control means comprising hydraulic actuator means, linkage coupling means connected between a moving member of said actuator means and said vent means for actuating said vent means in response to said actuator means and lever coupling means between said actuator means and said valve means for actuating said discharge means in response to said actuator means, said vent means and said discharge means being actuated substantially simultaneously.

17. Fluid storage and distributing means comprising a tank having a plurality of partitions defining a plurality of compartments, passageway means in said partitions, said passageway means including compartment valve means for controlling the passage of fluid therethrough, discharge valve means within said tank in one of said compartments, said discharge valve means being coupled to an aperture in said one compartment for controlling the discharge of fluid therethrough, vent means on said tank and control means for independently and coordinately adjusting certain of said vent means and the associated compartment valve means and other of said vent means and said discharge means, each control means comprising hydraulic actuator means, fluid coupling means connected between a fluid-responsive member of said actuator means and said vent means for actuating said vent means in response to said actuator means and lever coupling means between said actuator means and said valve means for actuating said discharge means in response to said actuator means, said vent means being actuated prior to said valve means.

18. In truck tanks, distributing means therefor comprising valve means connected to said tank for controlling the flow of fluid therein, vent means of said tank and control means for concurrently adjusting said vent means and said valve means comprising hydraulic actuator means, linkage coupling means between said actuator means and said vent means for making said vent means responsive to said energizing means and lever coupling means between said actuator means and said valve means for making said valve means responsive to said actuator means, said linkage coupling means comprising a plurality of links pivotably coupled together, a first of said links also being pivoted to said tank and a second of said links also being pivoted to said hydraulic actuator.

19. Apparatus according to claim 18, in which said second link is eccentrically pivoted to said hydraulic actuator.

20. Apparatus according to claim 18, in which said first link is adapted to actuate said vent means and is displaced in turn by said second link.

21. Apparatus according to claim 18, in which the length of said second link is adjustable.

(References on following page)

References Cited in the file of this patent

UNITED STATES PATENTS

| | | |
|---|---|---|
| 1,004,982 | Budlong | Oct. 3, 1911 |
| 1,139,754 | Denzinger | May 18, 1915 |
| 1,726,319 | Shield | Aug. 27, 1929 |
| 1,766,165 | Beebe | June 24, 1930 |
| 1,829,020 | Shield | Oct. 27, 1931 |
| 2,049,997 | Eaton | Aug. 4, 1936 |
| 2,241,316 | Porteous | May 16, 1941 |
| 2,256,891 | Burman | Sept. 23, 1941 |
| 2,652,070 | Marx | Sept. 15, 1953 |
| 2,730,126 | Jensen | Jan. 10, 1956 |
| 2,748,799 | Rath | June 5, 1956 |
| 2,789,572 | Madden | Apr. 23, 1957 |
| 2,821,991 | Marx | Feb. 4, 1958 |
| 2,872,941 | Soucy | Feb. 10, 1959 |
| 2,884,946 | Anderson | May 5, 1959 |
| 2,908,289 | Everett | Oct. 13, 1959 |